United States Patent
Chang et al.

(10) Patent No.: US 11,004,266 B2
(45) Date of Patent: May 11, 2021

(54) ARTICULATED MODEL REGISTRATION APPARATUS AND METHOD

(71) Applicant: ALCHERA INC., Seongnam-si (KR)

(72) Inventors: Jung Woo Chang, Seoul (KR); Young Kyoo Hwang, Seoul (KR); Jung Bae Kim, Seoul (KR)

(73) Assignee: ALCHERA INC., Seongnam-si (KR)

(*) Notice: Subject to any disclaimer, the term of this patent is extended or adjusted under 35 U.S.C. 154(b) by 0 days.

(21) Appl. No.: 16/494,055

(22) PCT Filed: Dec. 21, 2018

(86) PCT No.: PCT/KR2018/016548
§ 371 (c)(1),
(2) Date: Sep. 13, 2019

(87) PCT Pub. No.: WO2020/130211
PCT Pub. Date: Jun. 25, 2020

(65) Prior Publication Data
US 2020/0334904 A1    Oct. 22, 2020

(51) Int. Cl.
*G06T 17/20* (2006.01)
*G06T 7/73* (2017.01)
*G06T 19/20* (2011.01)

(52) U.S. Cl.
CPC ............ *G06T 17/20* (2013.01); *G06T 7/73* (2017.01); *G06T 19/20* (2013.01)

(58) Field of Classification Search
None
See application file for complete search history.

(56) References Cited

U.S. PATENT DOCUMENTS

| | | | | |
|---|---|---|---|---|
| 2012/0070070 | A1* | 3/2012 | Litvak | G06K 9/00201 382/154 |
| 2015/0186716 | A1* | 7/2015 | Litvak | G06K 9/4671 382/154 |
| 2017/0316255 | A1* | 11/2017 | Arata | G06K 9/00362 |
| 2017/0316578 | A1* | 11/2017 | Fua | G06T 7/246 |
| 2017/0344829 | A1* | 11/2017 | Lan | G06K 9/00369 |
| 2018/0068461 | A1* | 3/2018 | Shiozaki | G06T 7/75 |
| 2018/0353836 | A1* | 12/2018 | Li | G09B 19/0038 |
| 2019/0139297 | A1* | 5/2019 | Chen | G06T 15/04 |
| 2019/0147225 | A1* | 5/2019 | Thodberg | G06K 9/00281 382/226 |

(Continued)

FOREIGN PATENT DOCUMENTS

JP    4667900 B2    4/2011

OTHER PUBLICATIONS

Erol, Ali, et al. "Vision-based hand pose estimation: A review." Computer Vision and Image Understanding 108.1-2 (2007): 52-73.*

(Continued)

*Primary Examiner* — Ryan M Gray
(74) *Attorney, Agent, or Firm* — Rabin & Berdo, P.C.

(57) ABSTRACT

The present invention relates to an articulated model registration method and apparatus which three-dimensionally restore an articulated model of a body, such as a hand, an upper body, and a whole body, from an image and to acquire a two-dimensional landmark from a two-dimensional image to generate and estimate a three-dimensional articulated model corresponding thereto.

5 Claims, 11 Drawing Sheets

(56) References Cited

U.S. PATENT DOCUMENTS

| | | | | |
|---|---|---|---|---|
| 2019/0164346 A1* | 5/2019 | Kim | ...................... | G06T 19/006 |
| 2019/0272670 A1* | 9/2019 | Tagliasacchi | ...... | G06K 9/00355 |
| 2019/0278983 A1* | 9/2019 | Iqbal | .................... | G06K 9/6271 |
| 2019/0347826 A1* | 11/2019 | Zhang | .................. | G06K 9/4604 |
| 2019/0385381 A1* | 12/2019 | Black | ................... | G06K 9/6209 |
| 2020/0098166 A1* | 3/2020 | Ni | ........................ | G06T 15/405 |

OTHER PUBLICATIONS

Pisharady, Pramod Kumar, and Martin Saerbeck. "Recent methods and databases in vision-based hand gesture recognition: A review." Computer Vision and Image Understanding 141 (2015): 152-165.*

* cited by examiner

ARTICULATED MODEL REGISTRATION APPARATUS AND METHOD

TECHNICAL FIELD

The present invention relates to the three-dimensionally restoration of an articulated model of a body, such as a hand, an upper body, and a whole body, from an image and to the acquisition of a two-dimensional landmark from a two-dimensional image to generate and estimate a three-dimensional articulated model corresponding thereto.

BACKGROUND ART

A technology which three-dimensionally restores an articulated model of a body, for example, a hand, an upper body, or a whole body, from an image, has been continuously studied before potable photographing and display devices such as a smart phone become popular in recent years. Further, there are existing studies using a three-dimensional input such as an RGBD camera which acquires depth information as well as a two-dimensional image and a stereo camera which acquires three-dimensional information using a plurality of optical inputs.

Recently, as a result of rapid progress of a processor, studies which three-dimensionally restore an articulated model of a hand or a body by utilizing machine learning using a fast computing ability of a processor, especially, a deep learning technique are being performed.

Among such articulated model restoring techniques, there is a technique which three-dimensionally restores the articulated model using an inverse kinematics (IK) technique after acquiring a two-dimensional landmark using a deep learning technique. However, according to this technique, since a cost function is optimized using a Jacobian matrix or a conjugate gradient method, the computation is complicated so that a long processing time is required and specifically, power consumption of the portable device is excessive and there is a risk to fall into a local minimum.

DISCLOSURE

Technical Problem

The present invention relates to an articulated model registration apparatus and method which three-dimensionally restore an articulated model of a body from an image and acquire a two-dimensional landmark from a two-dimensional image to estimate a three-dimensional articulated model corresponding thereto with a less computation amount so that less processing time is consumed, a local minimum problem is solved and power consumption of a portable device such as a smart phone is reduced.

Technical Solution

The present invention provides an articulated model registration method including: a body image detecting step of detecting an image of a body area from an original image, a landmark extracting step of extracting one or more landmarks including an articulated point from the detected image of the body area, a body shape model generating step of generating an average three-dimensional body shape model, a conversion estimating step of estimating a position on a three-dimensional coordinate of the generated body shape model from a conversion estimating landmark including any one or more landmarks among the extracted landmarks, and a posture estimating step of estimating a position on a three-dimensional coordinate of the generated body shape model from any one or more landmarks among the extracted landmarks in which the posture estimating unit estimates the position on the three-dimensional coordinate of the landmark from a reference straight line connecting the position on the three-dimensional coordinate estimated from any one or more of the landmarks, in an arbitrary position on the three-dimensional coordinate.

Further, the present invention provides an articulated model registration apparatus, including: a body image detecting unit which detects an image of a body area from an original image, a landmark extracting unit which extracts one or more landmarks including an articulated point from the detected image of the body area, a body shape model generating unit which generates an average three-dimensional body shape model, a conversion estimating unit which estimates a position on a three-dimensional coordinate of the generated body shape model from one or more landmarks other than the articulated point among the landmarks, and a posture estimating unit which estimates a position on a three-dimensional coordinate of the generated body shape model from one or more articulated points among the landmarks in which the posture estimating unit estimates the position on the three-dimensional coordinate of the articulated point from a reference straight line connecting the position on the three-dimensional coordinate estimated from any one or more of the articulated points, in an arbitrary position on the three-dimensional coordinate.

Advantageous Effects

The articulated model registration apparatus and method according to the present invention acquire a two-dimensional landmark from a two-dimensional image to estimate a three-dimensional articulated model of a corresponding body, for example, a hand, an upper body, or a whole body, with a less computation amount, so that the processing time is reduced by up to one-two-hundredth of the IK technique, and specifically, the power consumption of the portable device such as a smart phone is reduced. Further, several candidate solutions are calculated as a closed-form solution so that local minimum problem caused when an optimization technique such as the IK technique is used does not occur.

BEST MODE

Figure 1:
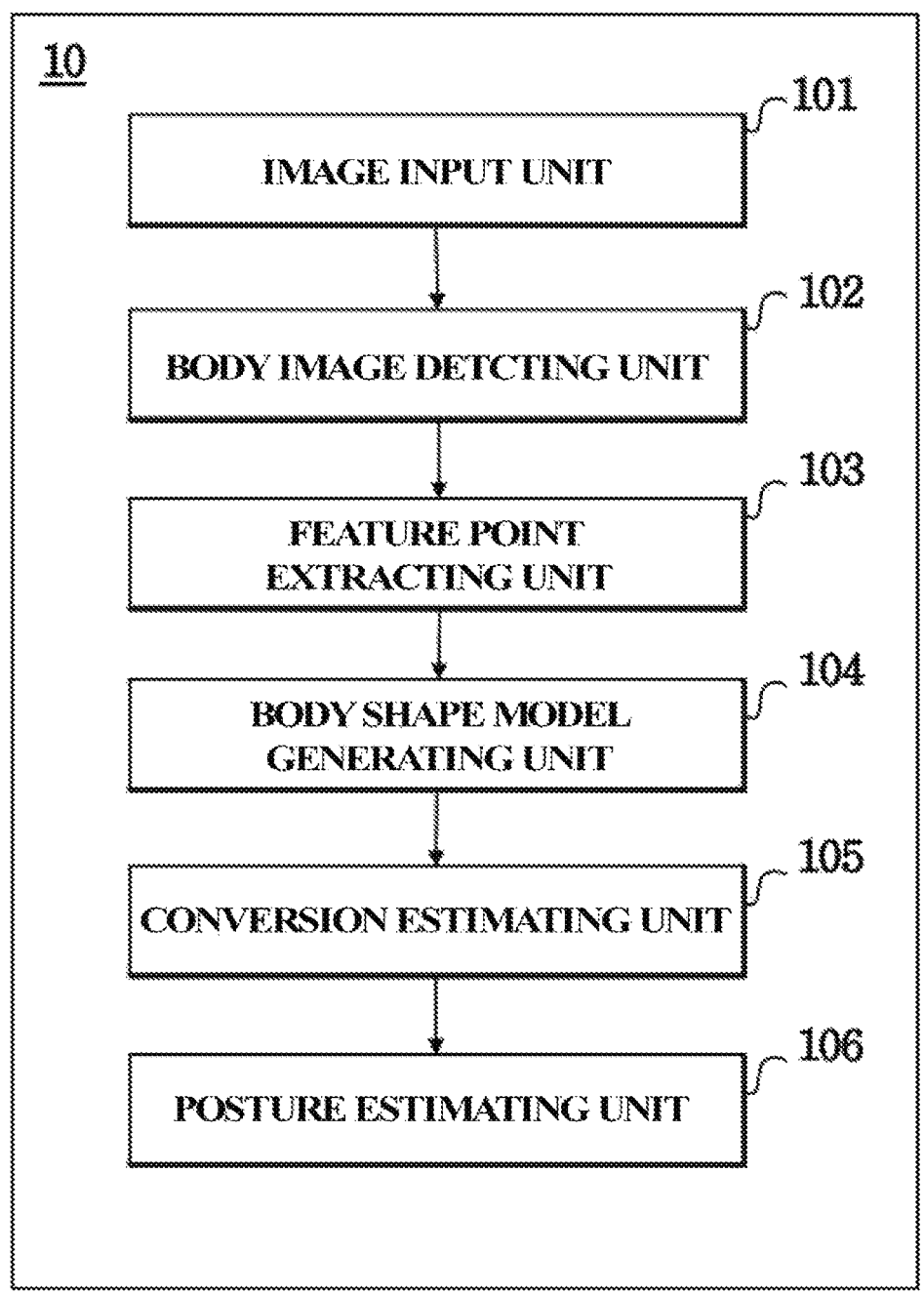
FIG. 1 illustrates an exemplary embodiment of an articulated model registration apparatus 10 according to the present invention.

The exemplary embodiment described in this specification may be entirely hardware, or partially hardware and partially software or entirely software. In this specification, "unit", "module", "device", or "system" refers to a computer related entity, such as hardware, a combination of hardware and software, or software. For example, in this specification, "unit", "module", "device", or "system" may be a process which is being executed, a processor, an object, an executable file, a thread of execution, a program, and/or a computer, but is not limited thereto. For example, both an application which is being executed in a computer and the computer may correspond to "unit", "module", "device", or "system" of this specification.

Exemplary embodiments are described with reference to flowcharts suggested in the drawings. In order to simply describe the present invention, the method has been illustrated and described as a series of block diagrams but the present invention is not limited to the order of the blocks and processes of some blocks may be performed in a different order from the order of the blocks illustrated and described in the specification or simultaneously performed with other blocks. Further, various different divergences, flow paths, and orders of the blocks which may achieve the same or similar results may be implemented. Further, all blocks which have been illustrated may not be required to implement the method described in the specification. Moreover, a method according to an exemplary embodiment of the present invention may be implemented in the form of a computer program to execute a series of processes and the computer program may be recorded in a computer readable recording medium.

Hereinafter, a configuration and characteristics of the present invention will be described by way of exemplary embodiments, which are not intended to be limiting, but merely illustrative of the invention.

Hereinafter, an articulated model registration apparatus and an articulated model registration method will be described with reference to the drawings.

FIG. 1 illustrates an exemplary embodiment of an articulated model registration apparatus 10 according to the present invention. The articulated model registration apparatus 10 includes a body image detecting unit 102 which detects an image of a body area from an original image, a landmark extracting unit 103 which extracts one or more landmarks including an articulated point from the detected image of the body area, a body shape model generating unit 104 which generates an average three-dimensional body shape model, a conversion estimating unit 105 which estimates a position on a three-dimensional coordinate of the generated body shape model from one or more landmarks other than the articulated point among the landmarks, and a posture estimating unit 106 which estimates a position on a three-dimensional coordinate of the generated body shape model from one or more articulated points of the landmarks.

The articulated model registration apparatus 10 according to an exemplary embodiment of the present invention may further include an image input unit 101. The image input unit 101 according to an exemplary embodiment of the present invention may receive an original image in the form of electronic data. The image input unit 101 may be a camera 204 or receive an original image input from the camera 204. Further, the original image input unit 101 may receive the original image from database in which the original image is stored as electronic data. Further, the image input unit 101 may receive the original image from an external network connected to database in which the original image is stored as electronic data.

Further, the image input unit 101 may receive a camera matrix representing a photographing referential point and direction on a three-dimensional coordinate of the original image.

The body image detecting unit 102 according to an exemplary embodiment of the present invention may detect an image of a body area from the original image. As long as the body image detecting unit 102 detects an image of a body area from the original image, the body image detecting unit 102 is not limited and may be an object detector or use the object detector. The object detector may be a machine learning based detector and for example, may be a single shot multibox detector (SSD) or you only look once (YOLO).

The landmark extracting unit 103 according to an exemplary embodiment of the present invention, for example, detects a boundary vector between the body area and a background area and then detects a body end point and a point between body ends at the boundary vector. Specifically, in the case of a hand area, a thumb area and an area of fingers other than the thumb may be detected. Further, during a process of detecting a boundary vector between the body area and the background area, for example, an area in which a color value of each pixel of the detected image of the body area corresponds to a range of a skin color value and an area in which the color value does not correspond to a range of the skin color value are converted into a white area and a black area, respectively, and then the boundary line vector between the body area and the background area may be detected.

Further, specifically, during a process of detecting a body end point and a point between body ends at the boundary vector, for example, a point corresponding to an inflection point which is equal to or lower than a predetermined angle is detected as a body end point and a point between body ends. For example, the point may be detected by a deep learning based method, specifically, a convolutional pose machine (CPM) based segmentation technique. Further, the boundary vector between the detected body area and the background area is input to a Harris corner detector and when a neighbor vector including a point corresponding to an inflection point has a concave shape, the point is detected as a body end point and when the neighbor vector has a convex shape, the point is detected as an inter-body point.

A three-dimensional body shape model generating unit 104 according to an exemplary embodiment of the present invention may load a three-dimensional body shape model from a three-dimensional body shape model database in which one or more three-dimensional body shape models are stored to generate the three-dimensional body shape model.

In the present invention, the "three-dimensional body shape model" is a position information set on a three-dimensional space of an end point and articulated points of the body and may refer to a three-dimensional body posture to be recognized from the original image. Specifically, the body shape model may be a basis vector set of a body shape dispersion constructed by the average three-dimensional body skeleton and principal component analysis. The average three-dimensional body shape model may be information on a shape and a size of a normal body with an average size of a body shape and a size used at the time of machine learning, for the purpose of registration of a three-dimensional body shape.

The conversion estimating unit 105 according to the exemplary embodiment of the present invention may estimate a position on a three-dimensional coordinate of the generated body shape model, not from an articulated point, but from one or more landmarks among a camera matrix on the three-dimensional coordinate and the landmarks of the original image, for example, by calling SolvePnP function of OpenCV.

Further, the posture estimating unit 106 may estimate the position on the three-dimensional coordinate of the articulated point with respect to a straight line connecting the position on the three-dimensional coordinate estimated from any one or more of the articulated points, in an arbitrary position on the three-dimensional coordinate.

In the present invention, the "posture" may refer to a position information set on the three-dimensional space of the end point and articulated points of the body.

Figure 2:
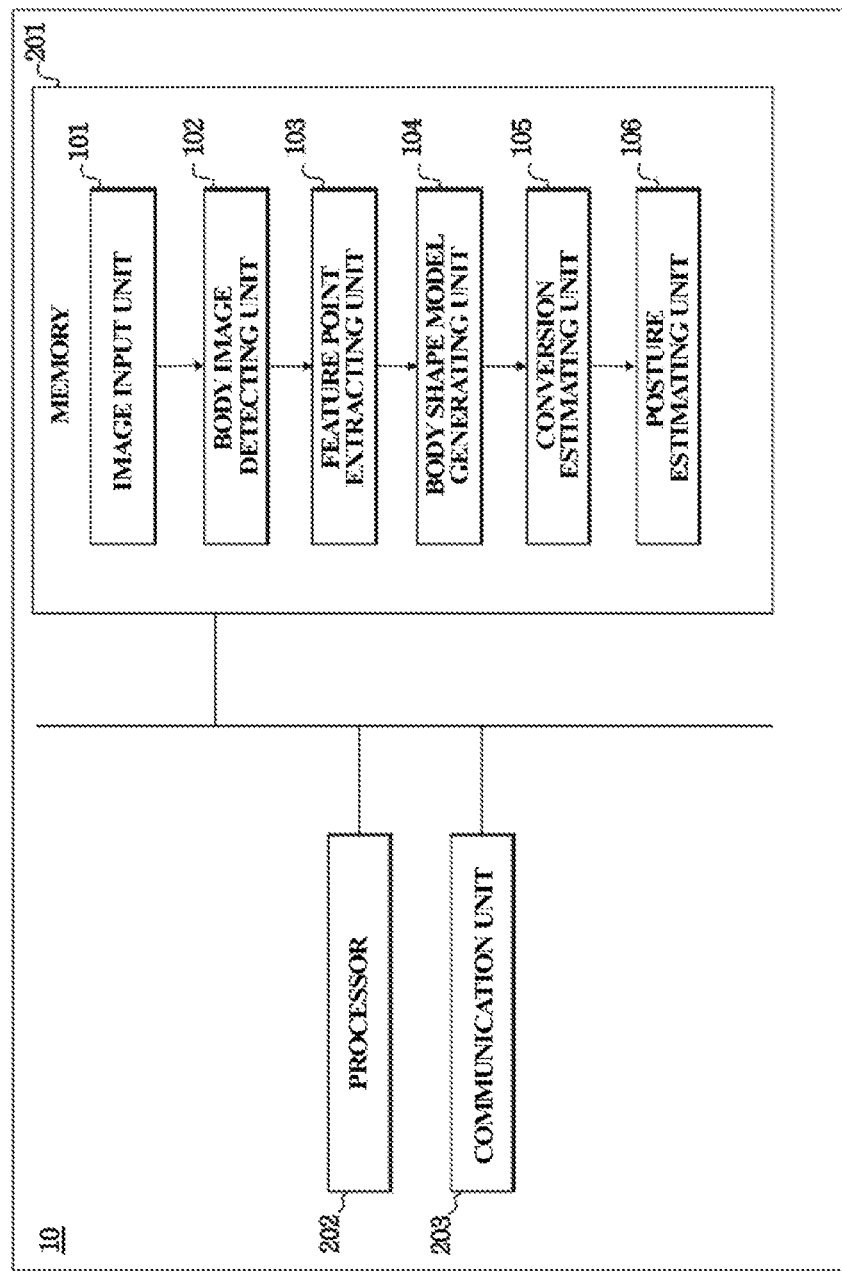
FIGS. 2 and 3 illustrate an exemplary embodiment of an articulated model registration apparatus 10 according to the present invention.

FIG. 2 illustrates an exemplary embodiment of an articulated model registration apparatus 10 according to the present invention. The articulated model registration apparatus 10 may include a memory 201, a processor 202, and a communication unit 203. The memory 201 may include a body image detecting unit 101, the landmark extracting unit 102, the body shape model generating unit 103, the conversion estimating unit 104, and the posture estimating unit 105. Specifically, the memory 201 may be executed through the processor 202 by statically or dynamically allocating the corresponding unit/module.

The memory 201 may include an arbitrary combination of volatile and nonvolatile memory appropriate for an intended purpose (which may be distributed or localized as appropriate) and for the convenience of description, may include other memory segments which is not illustrated in this example. For example, the memory 208 may include a code storage area, a code execution area, and a data area without departing from the scope of the present invention.

The communication unit 203 may provide a data communication function to search still image contents, audio and video contents or other contents and other activities through a satellite, a cable, a storage medium, Internet, or other content providers if it is appropriate for a given embodied example, and for example, may include a wireless communication standard such as wired Ethernet, cellular wireless communication, and Bluetooth®.

Figure 3:
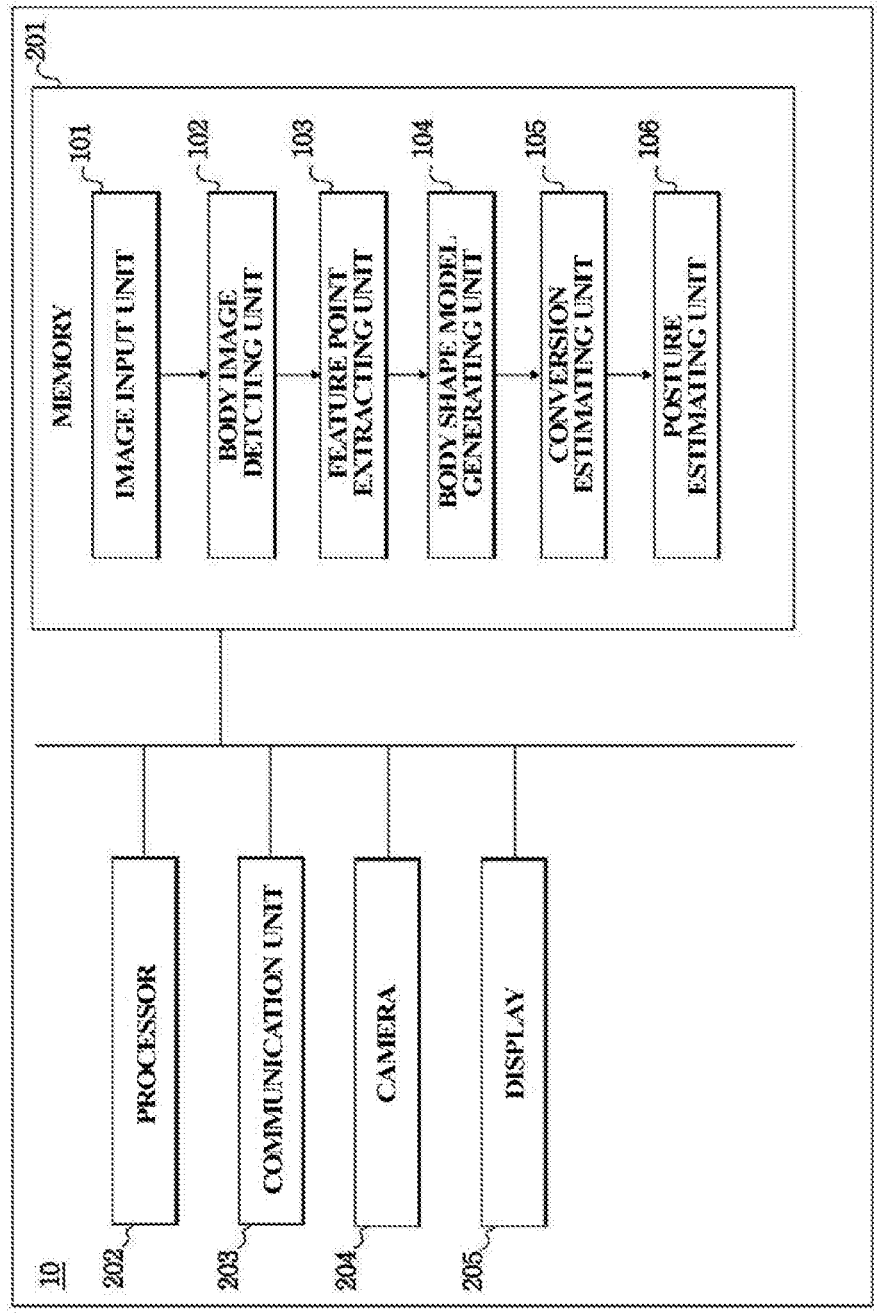

FIG. 3 illustrates an exemplary embodiment of an articulated model registration apparatus 10 according to the present invention. The articulated model registration apparatus 10 may include a memory 201, a processor 202, a communication unit 203, a camera 204, and a display 205. The memory 201 may include the body image detecting unit 101, the landmark extracting unit 102, the body shape model generating unit 103, the conversion estimating unit 104, and the posture estimating unit 105.

The camera 204 may convert optical information into two-dimensional pixel color information. Further, the camera 204 may convert two-dimensional pixel depth information. Furthermore, the camera 204 may generate a camera matrix representing a photographing reference point and direction on a three-dimensional coordinate of the original image.

In the present invention, the "image" may be data of two-dimensional visual information or data including depth information in addition to the two-dimensional visual information. Further, the image may correspond to any one frame of a moving image formed of a plurality of frames.

As long as the display 205 optically displays images, the display 205 is not limited and for example, may be a cathode ray tube, a liquid crystal display device, a light emitting diode device, a plasma display, and further include a touch panel.

The articulated model registration apparatus 10 according to the present invention may perform an articulated model registration method which will be described below and all the description of the articulated model registration method described below may be applied.

Figure 4:
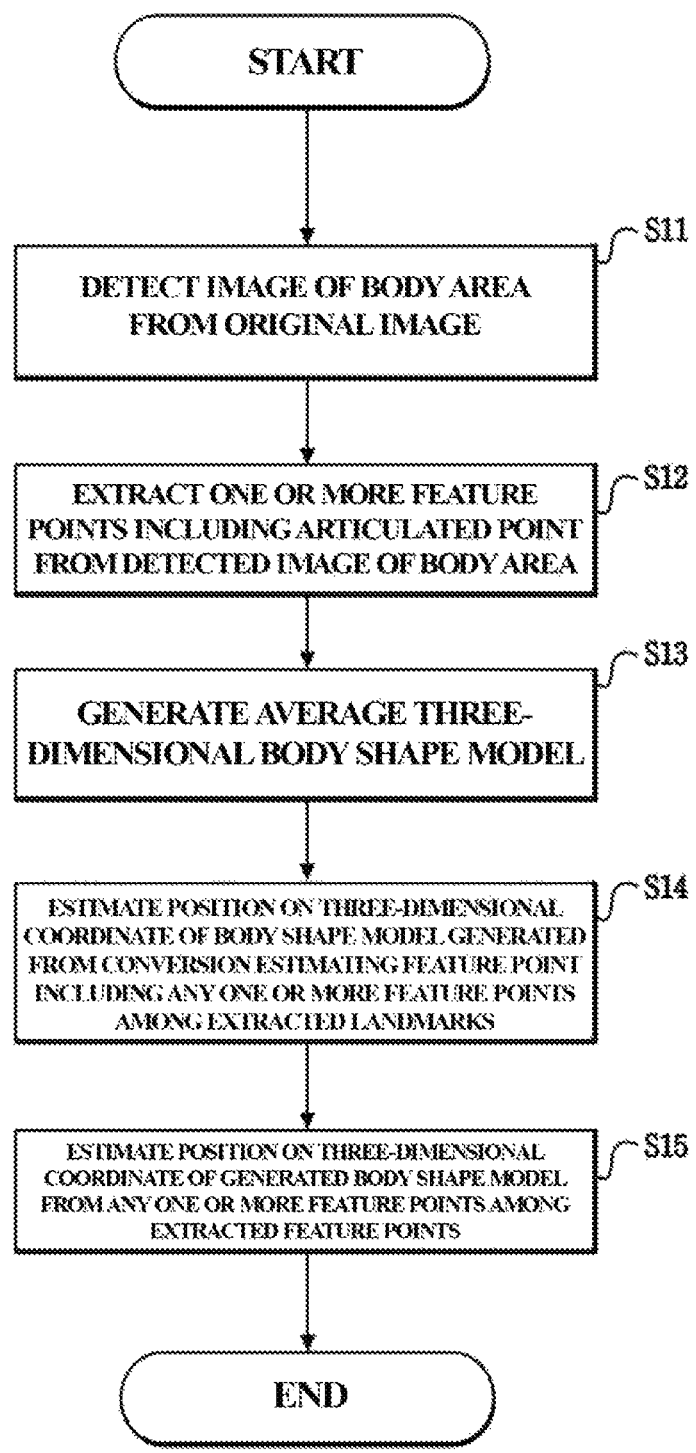
FIG. 4 illustrates an exemplary embodiment of an articulated model registration method according to the present invention.

FIG. 4 illustrates an exemplary embodiment of an articulated model registration method according to the present invention. The articulated model registration method according to the present invention includes a body image detecting step S11 of detecting an image of a body area from an original image, a landmark extracting step S12 of extracting one or more landmarks including an articulated point from the detected image of the body area, a body shape model generating step S13 of generating an average three-dimensional body shape model, a conversion estimating step S14 of estimating a position on a three-dimensional coordinate of the generated body shape model from a conversion estimating landmark including any one or more landmarks among the extracted landmarks, and a posture estimating step S15 of estimating a position on a three-dimensional coordinate of the generated body shape model from any one or more landmarks among the extracted landmarks.

Further, the posture estimating step S15 may estimate the position on the three-dimensional coordinate of the landmark from a reference straight line connecting the position on the three-dimensional coordinate estimated from any one or more of the landmarks, in an arbitrary position on the three-dimensional coordinate.

The body posture recognition method according to an exemplary embodiment of the present invention may further include a step of receiving an original image (not illustrated). Specifically, in the step of receiving an original image, the original image may be input in the form of electronic data, for example, input in the form of electronic data from the camera or the original image may be transmitted from the database in which the original image is stored as electronic data. Further, the original image input unit 101 may receive the original image from an external network connected to a database in which the original image is stored as electronic data or receive the original image from the camera 204.

The body image detecting step S11 according to an exemplary embodiment of the present invention may detect an image of a hand area from the original image.

As long as the body image detecting step S11 detects an image of a body area from the original image, the body image detecting step S11 is not limited and may be an object detector or use the object detector. The object detector may be a machine learning based detector and for example, may be a single shot multibox detector (SSD) or you only look once (YOLO).

The landmark extracting step S12 according to an exemplary embodiment of the present invention, for example, detects a boundary vector between the body area and a background area and then detects a body end point and a point between body ends at the boundary vector. Specifically, in the case of a hand area, a thumb area and an area of fingers other than the thumb may be detected. Further, during a process of detecting a boundary vector between the body area and the background area, for example, an area in which a color value of each pixel of the detected image of the body area corresponds to a range of a skin color value and an area in which the color value does not correspond to a range of the skin color value are converted into a white area and a black area, respectively, and then the boundary line vector between the body area and the background area may be detected.

Further, specifically, during a process of detecting a point between a body end point and a body end at the boundary vector, for example, a point corresponding to an inflection point which is equal to or lower than a predetermined angle is detected as a point between a body end point and a body end. For example, the point may be detected by a deep learning based method, specifically, a convolutional pose machine (CPM) based segmentation technique. Further, the boundary vector between the detected body area and the background area is input to a Harris corner detector and when a neighbor vector including a point corresponding to an inflection point has a concave shape, the point is detected as a finger end point and when the neighbor vector has a convex shape, the point is detected as a point between fingers.

The body shape model generating step S13 according to an exemplary embodiment of the present invention may generate a three-dimensional body shape model by matching an average three-dimensional hand shape model from a three-dimensional body shape model database in which one or more three-dimensional body shape models are stored.

The conversion estimating step S14 according to an exemplary embodiment of the present invention may estimate a position on a three-dimensional coordinate of the generated body shape model, not from an articulated point, but one or more landmarks among a camera matrix on the three-dimensional coordinate and the landmarks of the original image. For example, the conversion estimating step S14 may call SolvePnP function of OpenCV to estimate the position of the body shape model on the three-dimensional coordinate.

In the conversion estimating step S14 according to an exemplary embodiment of the present invention, the conversion estimating landmark may be a landmark corresponding to a joint which does not change according to the change of the joint angle.

When a landmark for the hand is estimated, the conversion estimating landmark may be a landmark corresponding to any one selected from a group consisting of a wrist, a root joint of an index finger, a root joint of a middle finger, a root joint of a ring finger, and a root joint of a small finger. A joint corresponding to a thumb and joints other than roots of the remaining four fingers have a high degree of freedom by the pose of the hand as well as the position of the hand so that the joints may not be used to estimate a position without estimating a pose which will be performed in a next step.

Further, when a landmark for the entire body is estimated, the conversion estimating landmark may be a landmark corresponding to a shoulder or hip joint.

Figure 6:
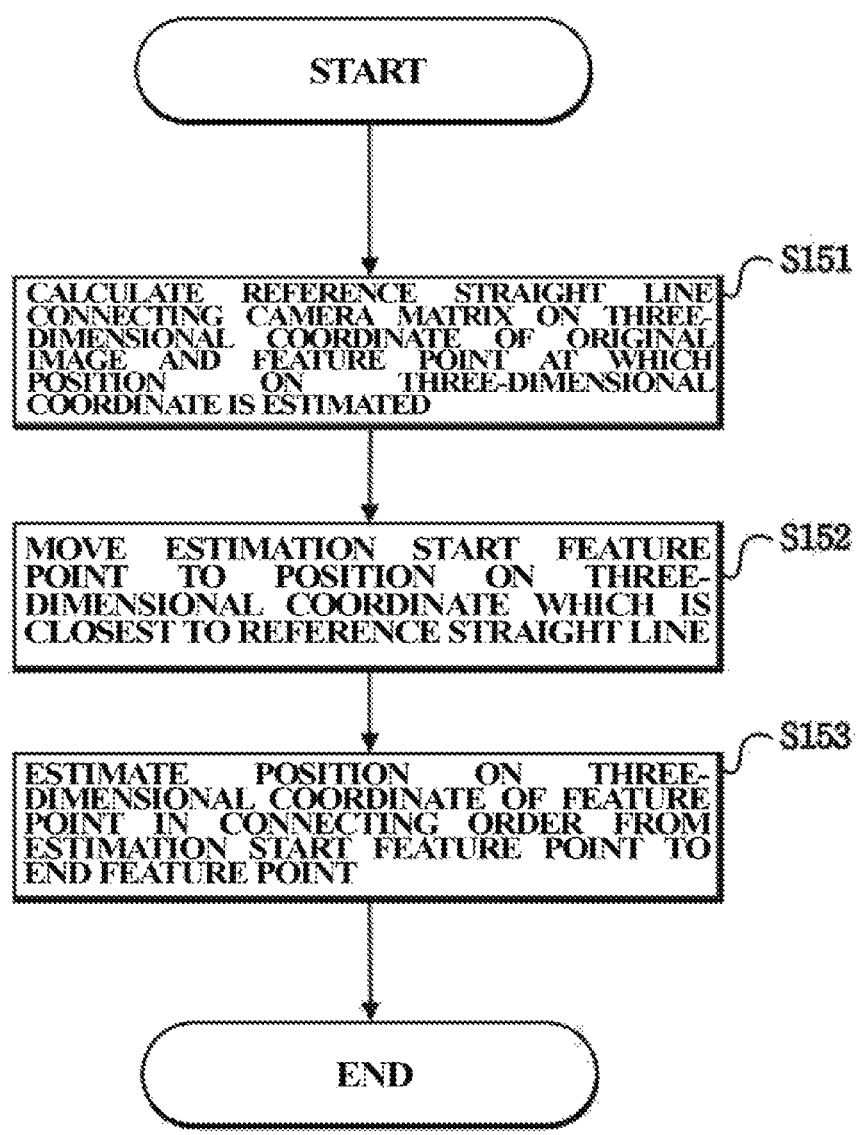
FIG. 6 illustrates specific steps included in a posture estimating step S15 according to the present invention.

FIG. 6 illustrates specific steps included in a posture estimating step S15 according to the present invention.

The posture estimating step S15 according to the present invention may include a step S151 of calculating a reference straight line connecting a camera matrix on a three-dimensional coordinate of the original image and a landmark at which the position on the three-dimensional coordinate is estimated.

Figure 5:
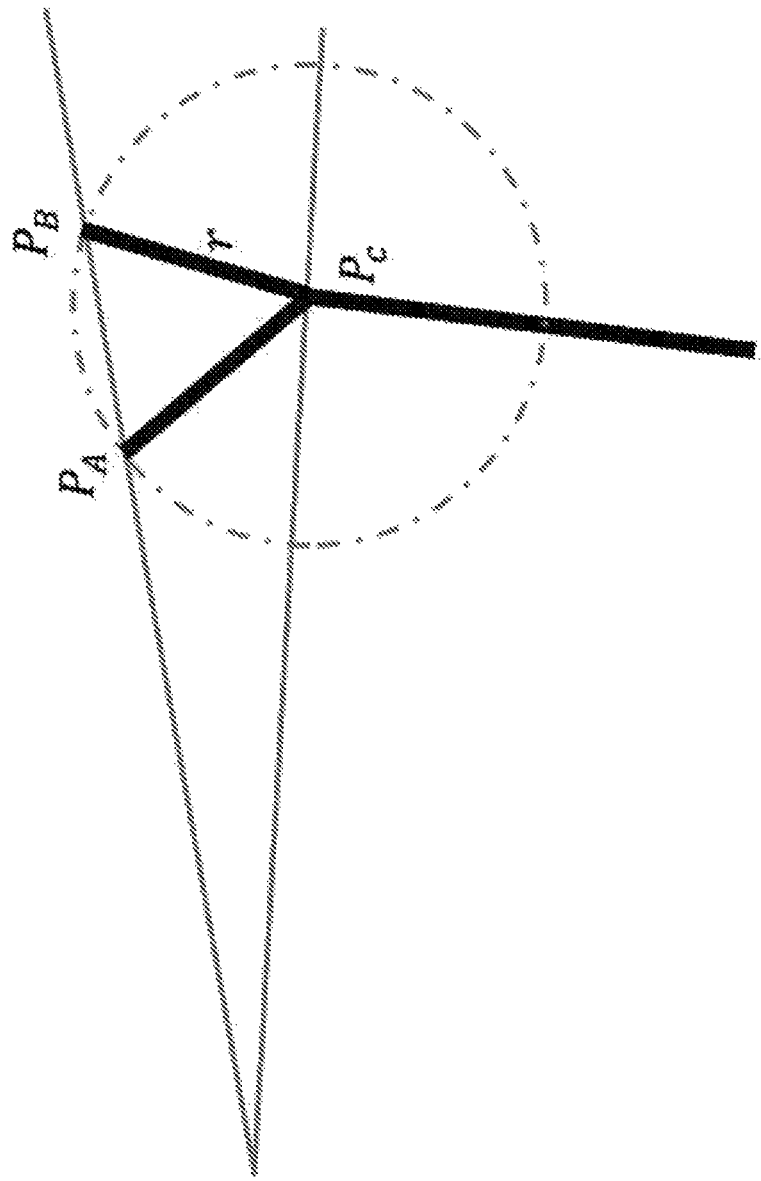
FIG. 5 two-dimensionally illustrates a process for a step of calculating a reference straight line.

The posture estimating step S15 according to the present invention may include a step S151' of calculating a reference straight line with a camera matrix which is a projection reference matrix on a three-dimensional coordinate and a landmark on a two-dimensional coordinate projected by the camera matrix from the original image and the process therefor is two-dimensionally illustrated in FIG. 5.

The step S151' of calculating a reference straight line may include a step S151' of calculating a reference straight line represented by the following Equation 1.

$$P_b + D_t \quad \text{[Equation 1]}$$

In Equation 1, a direction vector D is represented by the following Equation 2 and $P_b$ is represented by the following Equation 3.

$$D = (C_0 - C_2 \cdot x'') \times (C_0 - C_2 \cdot y'') \quad \text{[Equation 2]}$$

In Equation 2, $C_0$ and $C_2$ are first and third row components of the camera matrix C which is a projection reference matrix on a three-dimensional coordinate from the original image and x" and y" are coordinates on a two-dimensional coordinate system of the posture landmark.

$$(C_0 - C_2 \cdot x'') \cdot P_b = 0, (C_0 - C_2 \cdot y'') \cdot P_b = 0 \quad \text{[Equation 3]}$$

In Equation 3, $P_b$ may be calculated by setting a z coordinate value to be 0.

To be more specific, when there are a camera matrix C which is a projection reference matrix on a three-dimensional coordinate and one vertex $P_{3D}$ on the three-dimensional space, the 2D coordinate of the vertex is defined by the following Equation 3A.

$$(x', y', z') = C \cdot P_{3D}, P_{2D} = (x'', y'') = (x'/z', y'/z') \quad \text{[Equation 3A]}$$

When $P_{2D}$ and C are given, $P_{3D}$ lies on a straight line. When it is assumed that the straight line is $P_b + Dt$, one point $P_b$ and the direction vector D of the straight line may be obtained by the following method.

When individual rows of C are $C_0$, $C_1$, and $C_2$, D is calculated using the following Equation 3B.

$$x' = C_0 \cdot P_{3D}, y' = C_1 \cdot P_{3D}, z' = C_2 \cdot P_{3D}$$

$$x'' = C_0 \cdot P_{3D} / C_2 \cdot P_{3D}, y'' = C_1 \cdot P_{3D} / C_2 \cdot P_{3D}$$

$$(C_0 - C_2 \cdot x'') \cdot P_{3D} = 0, (C_0 - C_2 \cdot y'') \cdot P_{3D} = 0$$

$$D = (C_0 - C_2 \cdot x'') \times (C_0 - C_2 \cdot y'') \quad \text{[Equation 3B]}$$

$P_b$ obtains a cross point of the straight line and an xy plane. In the above Equation 3, $P_b$ is assumed as $(x_b, y_b, 0)$ and $x_b$ and $y_b$ may be calculated by solving a simultaneous equation for two expressions and two unknowns.

The posture estimating step S15 according to the present invention may include a step S152 of moving an estimation start landmark to a position on a three-dimensional coordinate which is the most proximate from the reference straight line.

The posture estimating step S15 according to the present invention may include an iterative estimating step S153 which estimates a position on the three-dimensional coordinate of the landmark in the connecting order from the estimation start landmark to an end landmark.

Figure 7:
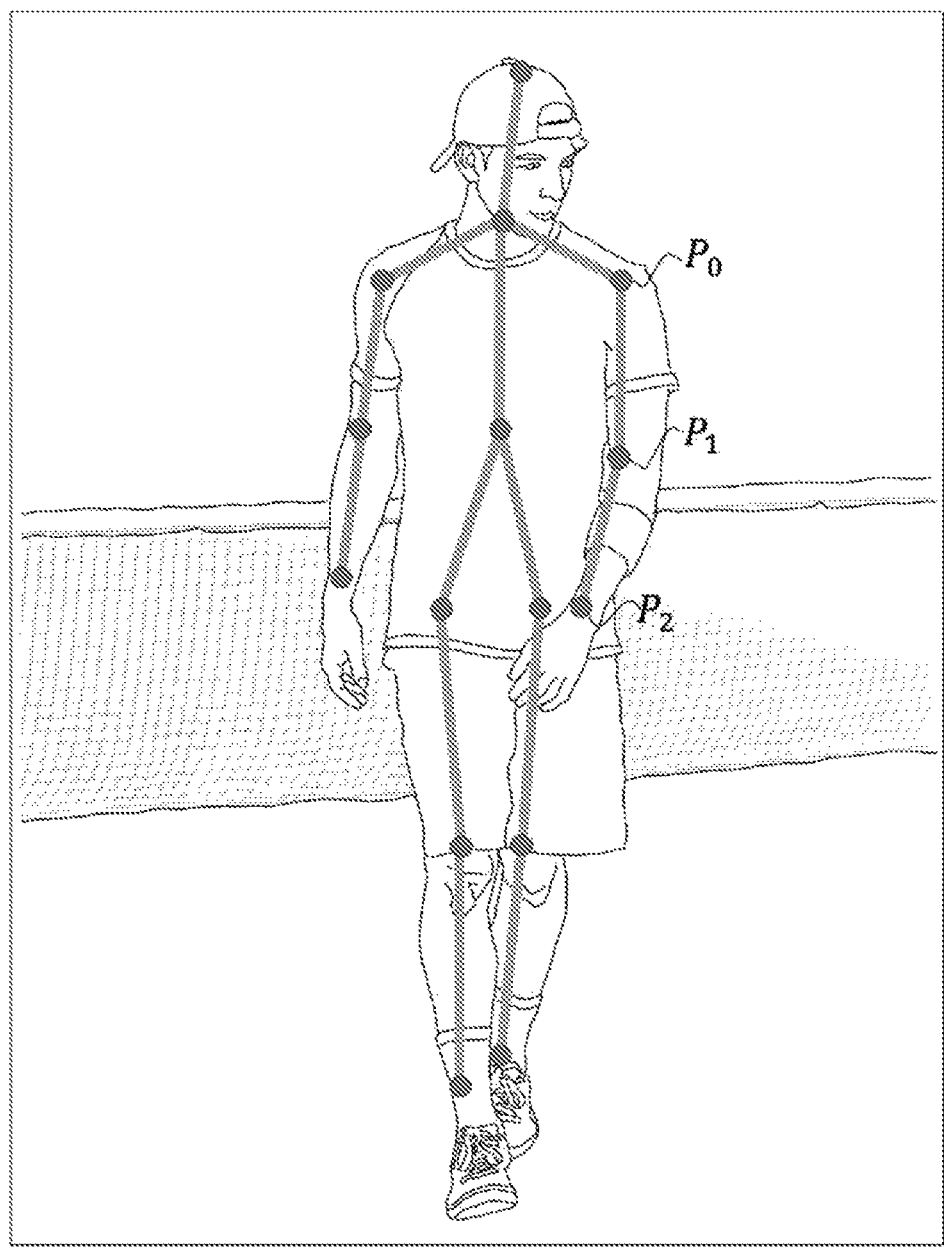
FIG. 7 illustrates an example which estimates positions on a three-dimensional coordinate of a landmark $P_0$ corresponding to a shoulder of the body, a landmark $P_1$ corresponding to an elbow, and a landmark $P_2$ corresponding to a wrist of the end of the body in this order, by an iterative estimating step S153 according to the present invention.

FIG. 7 illustrates an example which estimates positions on a three-dimensional coordinate of a landmark $P_0$ corresponding to a shoulder of the body, a landmark $P_1$ corresponding to an elbow, and a landmark $P_2$ corresponding to a wrist of the end of the body in this order, by an iterative estimating step S153 according to the present invention.

Figure 8:
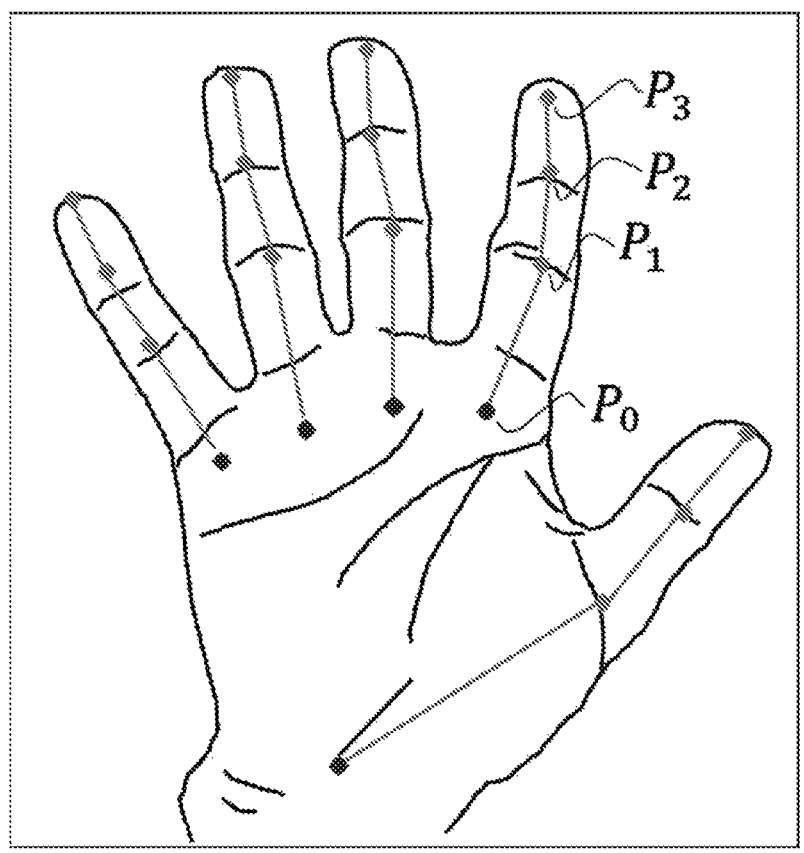
FIG. 8 illustrates an example which estimates positions on a three-dimensional coordinate of a landmark $P_0$ corresponding to a root joint of the hand of the body, specifically, the index finger, landmarks $P_1$ and $P_2$ corresponding to two joints of the index finger, and a landmark $P_3$ corresponding to an end of the index finger in this order, by an iterative estimating step S153 according to the present invention.

FIG. 8 illustrates an example which estimates positions on a three-dimensional coordinate of a landmark $P_0$ corresponding to a root joint of the hand of the body, specifically, the index finger, landmarks $P_1$ and $P_2$ corresponding to two joints of the index finger, and a landmark $P_3$ corresponding to an end of the index finger in this order, by an iterative estimating step S153 according to the present invention.

Figure 9:
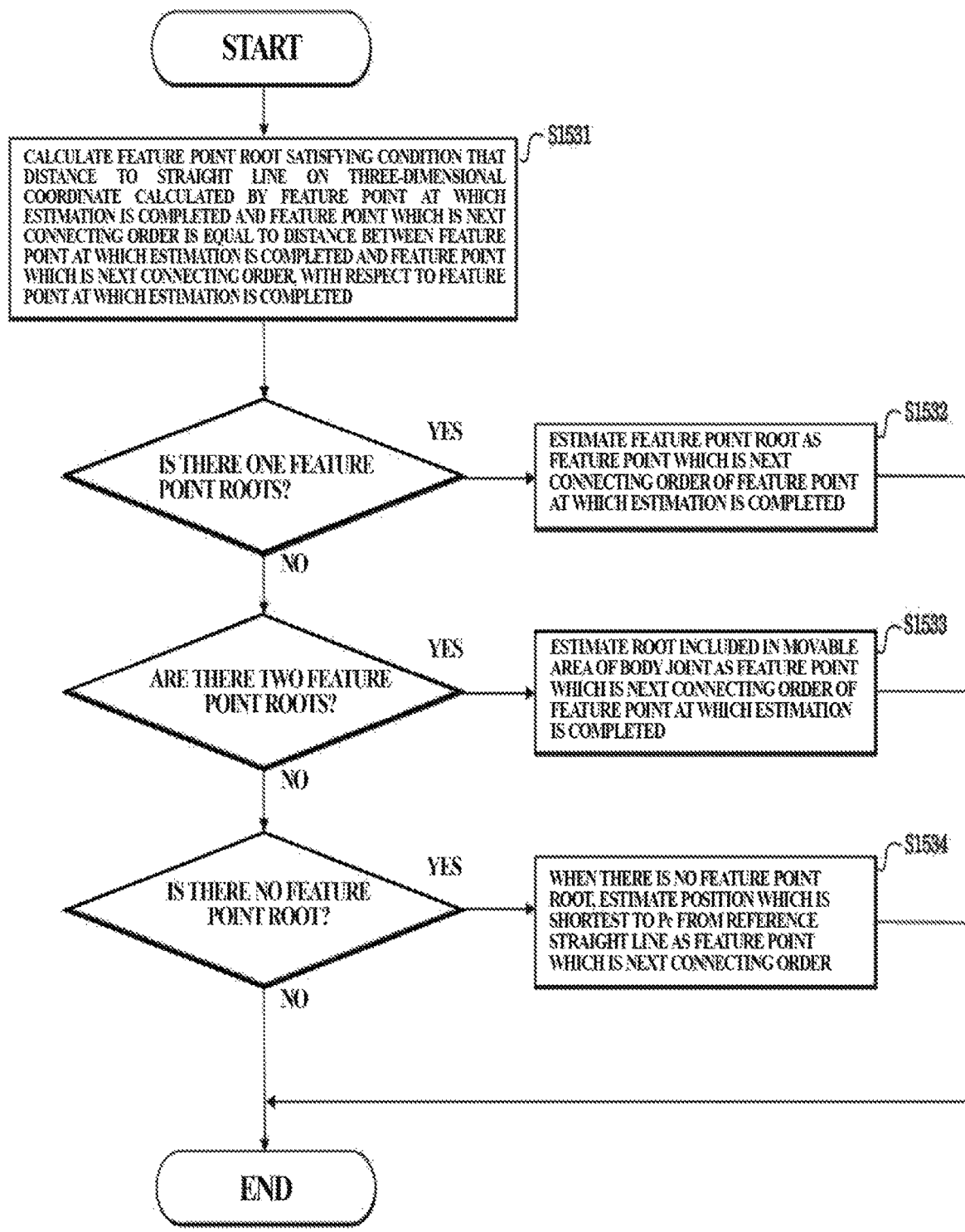
FIG. 9 illustrates specific steps included in an iterative estimating step S153 according to the present invention.

FIG. 9 illustrates specific steps included in an iterative estimating step S153 according to the present invention.

The iterative estimating step S153 according to the present invention may include a step S1531 of calculating a landmark root satisfying a condition that a distance to a straight line on a three-dimensional coordinate calculated by a landmark at which estimation is completed and a landmark which is a next connecting order is equal to the distance between the landmark at which estimation is completed and a landmark which is a next connecting order, with respect to the landmark at which estimation is completed.

As illustrated in FIG. 5, when a position of the existing joint is $P_c$ and a distance between joints is r, a vertex which is located on a three-dimensional straight line corresponding to the landmark of the next joint to be spaced apart from $P_c$ by r may be obtained by solving the following Equation 4 with respect to t. Normally, there are two roots of $P_a$ and $P_b$. However, there is one corresponding vertex (when the quadratic equation has multiple roots) or there is no vertex, depending on the distance r. Specifically, the iterative estimating step S153 may include a step S1531' of estimating a landmark which is a next connecting order by calculating a root of t by the following Equation 4, with respect to the landmark at which estimation is completed.

$$(P_c-P_b+D\cdot t)^2-r^2=0 \quad \text{[Equation 4]}$$

In Equation 4, Pc is a position on the three-dimensional coordinate of the landmark at which estimation is completed, r is a distance between a landmark at which estimation is completed and a landmark which is a next connecting order, and $P_b$ and D are equal to those of Equation 1.

When there is one landmark root, the iterative estimating step S153 according to the present invention may include a step S1532 of estimating a root of a landmark as a landmark which is a next connecting order of a landmark at which estimation is completed.

A direction in which the body joint bends is limited. It is possible to inspect whether the body joint includes a candidate root in a normally bendable range and when there are two landmark roots, the iterative estimating step S153 may include a step S1533 of estimating a root included in a movable area of a body joint as a landmark which is a next connecting order of the landmark at which estimation is completed.

The step S1533 of estimating to be a landmark may include a step S1533' of estimating $P_{candidate}$ satisfying the following Equation 5 by a landmark which is a next connecting order.

$$(P_{candidate}-P_c)\cdot N \quad \text{[Equation 5]}$$

In Equation 5, Pc is a position of a landmark at which estimation is completed, on the three-dimensional coordinate and N is a vector of a norm direction represented by the following Equation 6.

$$N=L\times C \quad \text{[Equation 6]}$$

Figure 10:
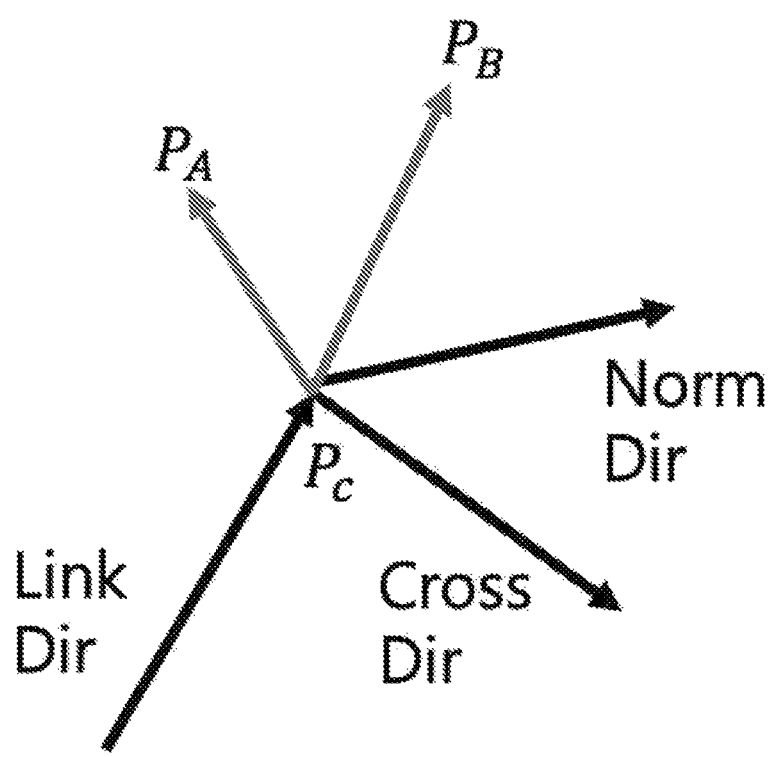
FIG. 10 two-dimensionally illustrates a calculating step of Equation 6.

In Equation 6, L may be $P_{candidate}-P_c$, that is, a link direction which is a difference between the position on the three-dimensional coordinate and a position on the three-dimensional coordinate of the root joint, C may be a cross direction which is a difference of any two landmarks among the estimation start landmarks. The above Equation 6 will be two-dimensionally illustrated in FIG. 10.

For example, when $P_{candidate}$ which is a candidate of a first joint is selected at the time of estimating a landmark of the hand, the first joint of each finger is bent in a palm direction, so that the palm direction may be set as a norm direction.

When there is no landmark root, the iterative estimating step S153 according to the present invention may include a step S1534 of estimating a position which is the shortest distance from Pc in the reference straight line as a landmark which is a next connecting order. Specifically, in the reference straight line, $P_c$ and the shortest distance may be the midpoint of the straight line on a three-dimensional coordinate between $P_A$ and $P_B$.

Figure 11:
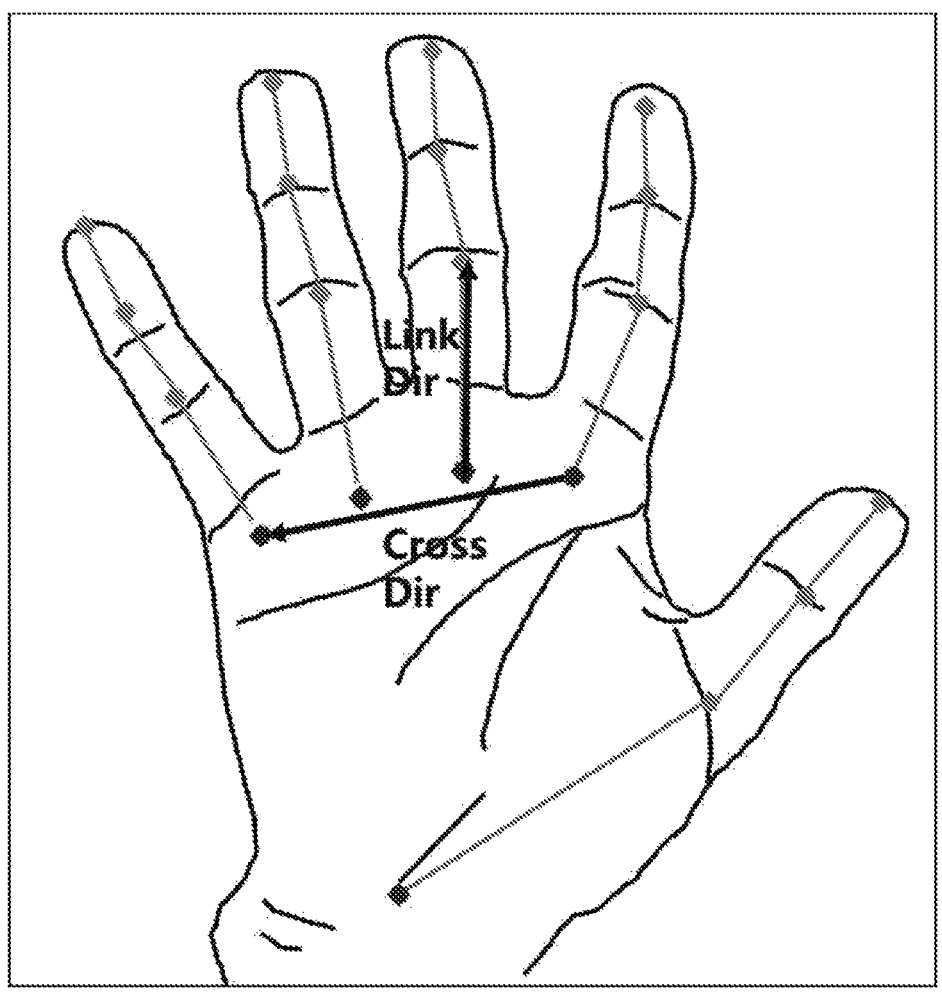
FIG. 11 illustrates an example which selects an appropriate root among candidates of a second joint of a middle finger of a hand of a body.

FIG. 11 illustrates an example which selects an appropriate root among candidates of a second joint of a middle finger of a hand of a body. C of the above Equation 6 may be a cross direction which is a difference of the vector on the three-dimensional coordinate between a landmark corresponding to a root joint of a small finger and a landmark corresponding to a root joint of an index finger.

The present invention may provide a program including a command for executing the articulated model registration method.

The present invention may provide a computer readable recording medium in which the above-described program is stored.

The specified matters and limited exemplary embodiments and drawings such as specific elements in the present invention have been disclosed for broader understanding of the present invention, but the present invention is not limited to the exemplary embodiments, and various modifications, additions and substitutions are possible from the disclosure by those skilled in the art.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

The invention claimed is:

1. An articulated model registration method, comprising:
a body image detecting step of detecting an image of a body area from an original image;
a landmark extracting step of extracting one or more landmarks including an articulated point from the detected image of the body area;
a body shape model generating step of generating an average three-dimensional body shape model;
a conversion estimating step of estimating a position on a three-dimensional coordinate of the generated body shape model from a conversion estimating landmark including any one or more landmarks among the extracted landmarks; and a posture estimating step of estimating a position on a three-dimensional coordinate of the generated body shape model from any one or more landmarks among the extracted landmarks, wherein the posture estimating step estimates the position on the three-dimensional coordinate of the landmark from a reference straight line connecting the position on the three-dimensional coordinate estimated from any one or more of the landmarks, in an arbitrary position on the three-dimensional coordinate, the posture estimating step includes a step of calculating a reference straight line connecting a camera matrix on a three-dimensional coordinate of the original image and a landmark at which a position on the three-dimensional coordinate is estimated, and the posture estimating step includes a step of moving an estimation start landmark to a position on the three-dimensional coordinate which is the closest from the reference straight line.

2. The articulated model registration method of claim 1, wherein the step of calculating the reference straight line includes a step of calculating the reference straight line by the camera matrix which is a projection reference matrix on the three-dimensional coordinate from the original image and the landmark on the two-dimensional coordinate projected by the camera matrix.

3. An articulated model registration method, comprising:
a body image detecting step of detecting an image of a body area from an original image;
a landmark extracting step of extracting one or more landmarks including an articulated point from the detected image of the body area;
a body shape model generating step of generating an average three-dimensional body share model;
a conversion estimating step of estimating a position on a three-dimensional coordinate of the generated body shape model from a conversion estimating landmark including any one or more landmarks among the extracted landmarks; and
a posture estimating step of estimating a position on a three-dimensional coordinate of the generated body shape model from any one or more landmarks among the extracted landmarks, wherein the posture estimating step estimates the position on the three-dimensional coordinate of the landmark from a reference straight line connecting the position on the three-dimensional coordinate estimated from any one or more of the landmarks, in an arbitrary position on the three-dimensional coordinate, the posture estimating step includes an iterative estimative step of estimating a position on a three-dimensional coordinate of the landmark in a connecting order from the estimation start landmark to an end landmark, and the iterative estimating step includes a step of calculating a landmark root satisfying a condition in which a distance from the straight line on the three-dimensional coordinate calculated by a landmark at which estimation is completed and a landmark which is a next connecting order is equal to the distance between the landmark at which estimation is completed and the landmark which is a next connecting order, with respect to the landmark at which estimation is completed.

4. The articulated model registration method of claim 3, wherein when there are two landmark roots, the iterative estimating step includes a step of estimating a root included in a movable area of a body joint as a landmark which is a next connecting order of a landmark at which estimation is completed.

5. The articulated model registration method of claim 3, wherein when there is no landmark root, the iterative estimating step includes a step of estimating a position which is the shortest distance from Pc in the reference straight as a landmark which is a next connecting order.

* * * * *